(12) United States Patent
Mital et al.

(10) Patent No.: US 10,927,733 B2
(45) Date of Patent: Feb. 23, 2021

(54) SYSTEM AND APPARATUS TO MITIGATE DIESEL EXHAUST FLUID DEPOSITS IN EXHAUST SYSTEM FLEXIBLE COUPLINGS

(71) Applicant: GM Global Technology Operations LLC, Detroit, MI (US)

(72) Inventors: Rahul Mital, Rochester Hills, MI (US); Daryl J. D'Andrea, Holly, MI (US); Bilal A. Rathur, Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/433,652

(22) Filed: Jun. 6, 2019

(65) Prior Publication Data

US 2020/0386133 A1 Dec. 10, 2020

(51) Int. Cl.
| | |
|---|---|
| *F01N 3/02* | (2006.01) |
| *F01N 3/20* | (2006.01) |
| *F01N 13/08* | (2010.01) |
| *F01N 3/08* | (2006.01) |

(52) U.S. Cl.
CPC .............. *F01N 3/02* (2013.01); *F01N 3/2046* (2013.01); *F01N 13/08* (2013.01); *F01N 3/0842* (2013.01); *F01N 2290/08* (2013.01); *F01N 2610/01* (2013.01)

(58) Field of Classification Search
CPC ...... F01N 3/2033; F01N 3/206; F01N 3/2066; F01N 3/208; F01N 2900/1806; F01N 2610/01; F01N 2610/02; F01N 2610/03; F01N 2610/14; F01N 2610/1406; F01N 2610/1413; F01N 2610/1493
USPC ........................................... 60/295, 301, 303
See application file for complete search history.

(56) References Cited

U.S. PATENT DOCUMENTS

| | | | |
|---|---|---|---|
| 2007/0000240 A1* | 1/2007 | Hirata ................ | B01D 53/9431 60/286 |
| 2008/0148721 A1* | 6/2008 | Wirth .................... | F01N 3/2066 60/295 |
| 2012/0227376 A1* | 9/2012 | Deyoung ................ | F01N 13/18 60/272 |
| 2014/0102082 A1* | 4/2014 | Tobben ................... | F01N 13/08 60/295 |

* cited by examiner

*Primary Examiner* — Mark A Laurenzi
*Assistant Examiner* — Mickey H France

(57) ABSTRACT

A system to mitigate diesel exhaust fluid deposits in vehicle exhaust system flexible couplings includes a diesel exhaust pipeline. A diesel exhaust fluid injector is connected to the diesel exhaust pipeline to inject a diesel exhaust fluid into the diesel exhaust pipeline. A flexible coupling is connected to the diesel exhaust pipeline. A diesel exhaust fluid collection device is positioned in the diesel exhaust pipeline between a connection location into the diesel exhaust pipeline of the diesel exhaust fluid injector and the flexible coupling. The diesel exhaust fluid collection device includes a liquid diesel exhaust fluid collection volume where an un-vaporized portion of the diesel exhaust fluid is collected.

16 Claims, 5 Drawing Sheets

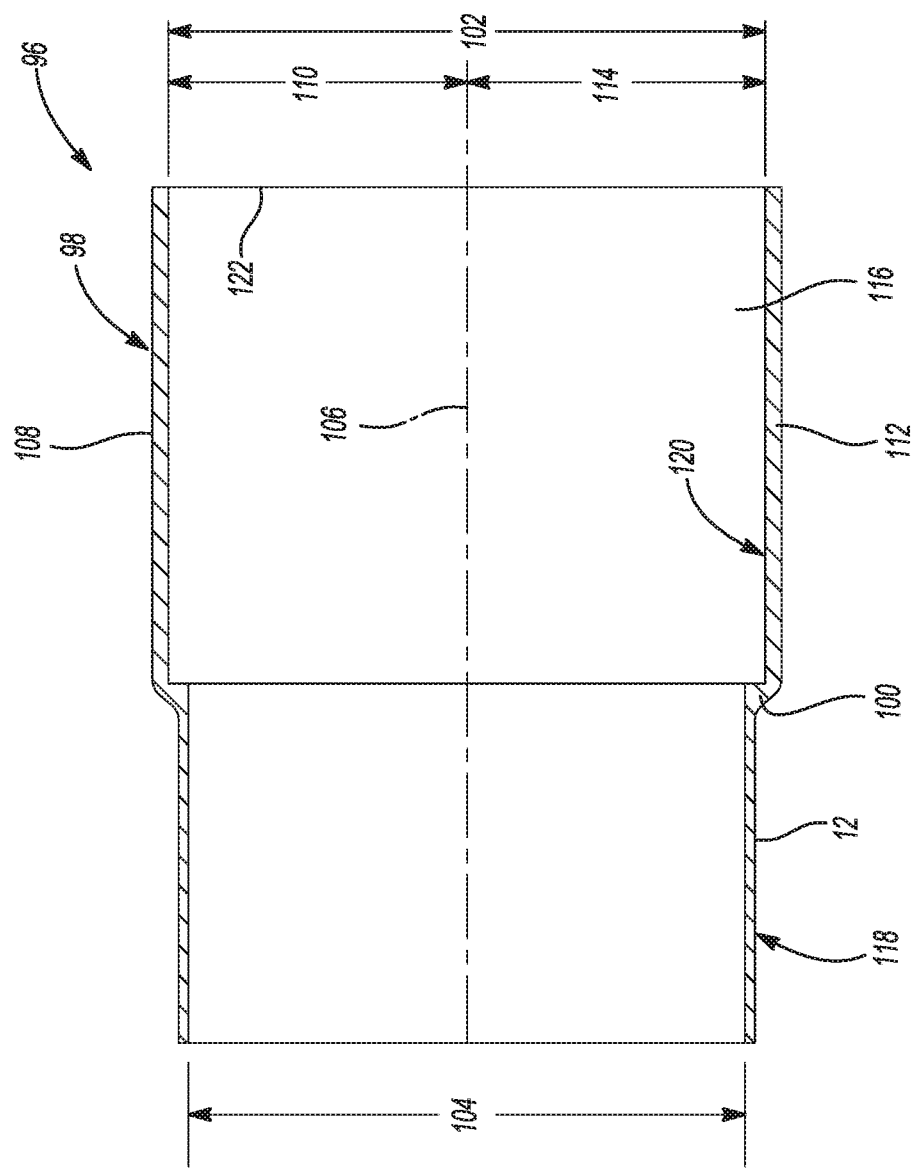

US 10,927,733 B2

SYSTEM AND APPARATUS TO MITIGATE DIESEL EXHAUST FLUID DEPOSITS IN EXHAUST SYSTEM FLEXIBLE COUPLINGS

INTRODUCTION

The present disclosure relates to diesel engine exhaust fluid deposits occurring in diesel exhaust systems.

Diesel systems in vehicles commonly add a diesel exhaust fluid (DEF), commonly in the form of urea, to exhaust systems. The DEF reduces nitrogen oxide (NOx) emissions from the exhaust system. Diesel engine exhaust systems also commonly include a flexible coupling which helps reduce passage of engine and transmission vibrations and noise into the vehicle passenger compartment. DEF which is not completely vaporized and entrained can build up in the convolutions commonly used in known flexible couplings. This portion of the DEF crystallizes and builds up until the flexible coupling can either fail to isolate vibration and noise, or completely fail by cracking or similar component damage. For this reason, known designs of diesel exhaust systems commonly position the flexible coupling upstream of the DEF injection location into the exhaust system so DEF crystallization in the flexible coupling is prevented.

Where arrangement and component size constraints prevent provision of the configuration which places the flexible coupling upstream of the DEF injection location, other means to mitigate DEF crystallization in the flexible coupling have been largely unsuccessful.

Thus, while current diesel engine exhaust systems having DEF injection achieve their intended purpose, there is a need for a new and improved system and method for mitigating diesel exhaust fluid deposits in exhaust system flexible couplings.

SUMMARY

According to several aspects, a system to mitigate diesel exhaust fluid deposits in vehicle exhaust system flexible couplings includes a diesel exhaust pipeline. A diesel exhaust fluid injector is connected to the diesel exhaust pipeline injecting a diesel exhaust fluid into the diesel exhaust pipeline. A flexible coupling is connected to the diesel exhaust pipeline. A diesel exhaust fluid collection device is positioned in the diesel exhaust pipeline, the diesel exhaust fluid collection device having a liquid diesel exhaust fluid collection volume where an un-vaporized portion of the diesel exhaust fluid is collected.

In another aspect of the present disclosure, a releasable connection connects the diesel exhaust fluid collection device to the diesel exhaust pipeline to allow for removal of the diesel exhaust fluid collection device.

In another aspect of the present disclosure, the releasable connection defines a flanged joint.

In another aspect of the present disclosure, the releasable connection defines a clamp joint.

In another aspect of the present disclosure, the diesel exhaust fluid collection device is positioned between a connection location into the diesel exhaust pipeline of the diesel exhaust fluid injector and the flexible coupling.

In another aspect of the present disclosure, the liquid diesel exhaust fluid collection volume defines a low point cavity.

In another aspect of the present disclosure, the diesel exhaust fluid collection device includes a central flow passage sized to equal an internal flow passage of the diesel exhaust pipeline, the central flow passage equally divided along a central axis having an upper wall of the diesel exhaust fluid collection device equally spaced from a bottom wall by a radial dimension.

In another aspect of the present disclosure, the diesel exhaust fluid collection device includes a lower portion having an inner wall spaced from the central axis at a wall spacing dimension which is greater than the radial dimension.

In another aspect of the present disclosure, the liquid diesel exhaust fluid collection volume defines a cavity between the inner wall and the bottom wall where the un-vaporized diesel exhaust fluid is collected.

In another aspect of the present disclosure, the diesel exhaust fluid collection device includes: a lower portion having an inner wall spaced from a central axis; a cavity provided within the lower portion for collection of the un-vaporized diesel exhaust fluid, the cavity having an upper ceiling provided by an extension portion of the diesel exhaust fluid collection device extending toward an upstream end of the diesel exhaust fluid collection device; and a dead-end wall bounded within the cavity and the upper ceiling.

In another aspect of the present disclosure, the diesel exhaust fluid collection device includes a cylindrical-shaped body stepped downward from an inner wall of the diesel exhaust pipeline defining a lowest elevated surface, with an inner diameter of the body being greater than an inner diameter of the diesel exhaust pipeline and providing a cylindrical-shaped cavity within the body, wherein the un-vaporized diesel exhaust fluid collects within the cavity on the lowest elevated surface of the body.

According to several aspects, a system to mitigate diesel exhaust fluid deposits in vehicle exhaust system flexible couplings includes a diesel exhaust pipeline. A diesel exhaust fluid injector is connected to the diesel exhaust pipeline injecting a diesel exhaust fluid into the diesel exhaust pipeline. A flexible coupling is connected to the diesel exhaust pipeline. A diesel exhaust fluid collection device is positioned in the diesel exhaust pipeline between a connection location into the diesel exhaust pipeline of the diesel exhaust fluid injector and the flexible coupling. The diesel exhaust fluid collection device has a liquid diesel exhaust fluid collection volume where an un-vaporized portion of the diesel exhaust fluid is collected.

In another aspect of the present disclosure, the diesel exhaust fluid collection device includes: a lower portion having an inner wall spaced from a central axis; and the liquid diesel exhaust fluid collection volume defines a cavity provided within the lower portion for collection of the un-vaporized diesel exhaust fluid on the inner wall.

In another aspect of the present disclosure, the inner wall includes an upwardly sloping surface.

In another aspect of the present disclosure, the inner wall is substantially planar and parallel with the central axis.

In another aspect of the present disclosure, an inner diameter of a body of the diesel exhaust fluid collection device is greater than an inner diameter of the diesel exhaust pipeline.

In another aspect of the present disclosure, a substantially cylindrical-shaped cavity is provided within the body.

According to several aspects, a system to mitigate diesel exhaust fluid deposits in vehicle exhaust system flexible couplings includes a diesel exhaust pipeline. A diesel exhaust fluid injector is connected to the diesel exhaust pipeline injecting a diesel exhaust fluid into the diesel exhaust pipeline. A flexible coupling is connected to the diesel exhaust pipeline downstream of a connection location of the diesel exhaust fluid injector. A diesel exhaust fluid collection device is positioned in the diesel exhaust pipeline between the connection location into the diesel exhaust pipeline of the diesel exhaust fluid injector and the flexible coupling. The diesel exhaust fluid collection device has a liquid diesel exhaust fluid collection volume where an un-vaporized portion of the diesel exhaust fluid is collected, mitigating carryover of the un-vaporized portion of the diesel exhaust fluid into the flexible coupling.

In another aspect of the present disclosure, an inner diameter of a body of the diesel exhaust fluid collection device is greater than an inner diameter of the diesel exhaust pipeline. A substantially cylindrical-shaped cavity is provided within the body is centrally disposed with respect to an axis of the body allowing collection of the un-vaporized portion of the diesel exhaust fluid to be provided at any horizontal axial orientation of the body.

In another aspect of the present disclosure, the diesel exhaust fluid collection device includes: a body having a central axis with an upper wall and a bottom wall equally spaced about the central axis; and a lower portion having an inner wall spaced below the bottom wall defining a cavity between the inner wall and the bottom wall, the cavity collecting the un-vaporized portion of the diesel exhaust fluid.

Further areas of applicability will become apparent from the description provided herein. It should be understood that the description and specific examples are intended for purposes of illustration only and are not intended to limit the scope of the present disclosure.

DESCRIPTION OF THE DRAWINGS

The drawings described herein are for illustration purposes only and are not intended to limit the scope of the present disclosure in any way.

FIG. 5 is a front elevational partial cross-sectional view of another aspect of a system and apparatus modified from FIG. 1.

DETAILED DESCRIPTION

The following description is merely exemplary in nature and is not intended to limit the present disclosure, application, or uses.

Figure 1:
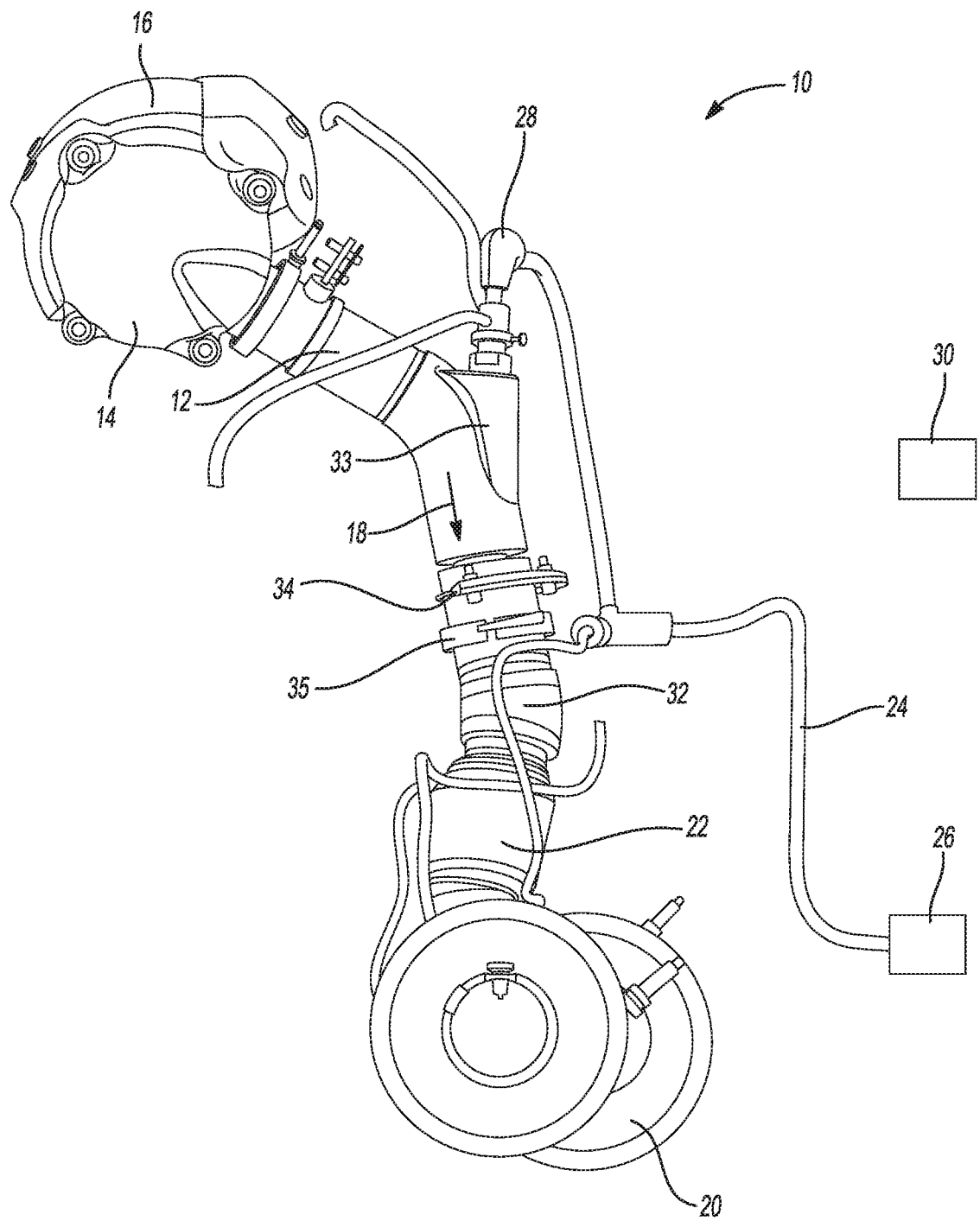
FIG. 1 is a rear elevational view looking forward of a system and apparatus to mitigate diesel exhaust fluid deposits in exhaust system flexible couplings according to an exemplary aspect.

Referring to FIG. 1, a system and apparatus to mitigate diesel exhaust fluid deposits in vehicle exhaust system flexible couplings 10 includes a diesel exhaust pipeline 12 which receives diesel exhaust gas from an engine exhaust system 14 downstream of a diesel engine 16 (only partially shown for clarity). Diesel exhaust gas flows in a flow direction 18 within the diesel exhaust pipeline 12 toward a downstream catalyst 20 prior to discharge to atmosphere. Engine and transmission vibration and exhaust system noise and vibration are decoupled between the engine exhaust system 14 and the downstream catalyst 20 using a flexible coupling 22.

The diesel engine 16 can be run with a lean burn air-to-fuel ratio (overstoichiometric ratio) to ensure full combustion of soot. An excess of air however, can lead to generation of nitrogen oxides ($NO_x$) from nitrogen in the air. Selective catalytic reduction is therefore used to reduce the amount of $NO_x$ released into the atmosphere. The diesel exhaust fluid (DEF) from a separate DEF tank 26 is injected into the diesel exhaust pipeline 12 using a DEF injector 28, where liquified DEF commonly in the form of a 32.5% solution of urea vaporizes and decomposes to form ammonia and carbon dioxide. Within the pipeline downstream of the DEF injection location, $NO_x$ is catalytically reduced by the ammonia ($NH_3$) produced from the urea into water ($H2O$) and nitrogen ($N_2$), which are released through the exhaust to atmosphere.

DEF fluid injection timing and injection rate are controlled by an exhaust system controller 30, which may form a portion of an engine controller or module. Diesel exhaust pipeline gas temperature and engine operating conditions are collected as signals for example from exhaust gas temperature and engine speed sensors and forwarded to the exhaust system controller 30 for use in determining when to initiate DEF flow and a required DEF flow rate.

A configuration of the diesel exhaust pipeline 12 which positions the DEF injector 28 upstream of the flexible coupling 22 could permit liquified DEF to collect in the tortuous pathways of the flexible coupling 22, therefore according to several aspects a DEF collection device 32 is positioned between a connection location 33 into the diesel exhaust pipeline 12 of the DEF injector 28 and the flexible coupling 22. The DEF collection device 32 provides a liquid DEF collection volume where un-vaporized DEF which can result at low engine rpm, at low exhaust flow rate conditions such as occurring at low exhaust gas temperatures, and when low ambient temperatures are present is collected. The DEF collection device 32 liquid DEF collection volume provides for collection of liquid DEF without allowing carryover of the liquid DEF to the flexible coupling 22. This un-vaporized volume of DEF will subsequently vaporize as the exhaust temperature and flow rate increase upstream of the flexible coupling 22. According to several aspects, the DEF collection device 32 is connected to the diesel exhaust pipeline 12 using a connection 34 which can be a releasable joint such as a flanged joint, or the connection 34 can be a clamp joint 35 (shown as an optional joint) to allow for removal of the DEF collection device 32. According to other aspects, the connection 34 can also define a welded or brazed joint, or other known connection method.

Referring to FIG. 2 and again to FIG. 1, the flexible coupling 22 includes multiple flexible members 36 which create multiple cavities 38 in the flexible members 36. The cavities 38 can collect un-vaporized or liquified DEF, which then crystallizes, either filling the cavities 38, particularly those cavities 38 at the upstream end of the flexible coupling 22 or rendering the flexible members 36 inflexible. The DEF collection device 32 of the present disclosure collects un-vaporized or liquified DEF upstream of the flexible coupling 22, mitigating against crystallization of the DEF within the flexible coupling 22. According to several aspects the DEF collection device 32 includes a central flow passage 40 sized to be substantially equal in size to an internal flow passage 42 of the diesel exhaust pipeline 12. The central flow passage 40 is equally divided along a central axis 44 such that an upper wall 46 of the DEF collection device 32 is equally spaced from a bottom wall 48 partially shown in phantom with respect to the central axis 44 by a radial dimension 50. To collect liquified DEF, the DEF collection device 32 is therefore also provided with a lower portion 52 having an inner wall 54 spaced from the central axis 44 at a wall spacing dimension 56 which is greater than the radial dimension 50. A cavity 58 is thereby defined between the inner wall 54 and the bottom wall 48, wherein liquid DEF can collect.

As temperature and flow rate conditions within the DEF collection device 32 and the diesel exhaust pipeline 12 increase above the conditions which permitted formation and collection of the liquified DEF, the liquified DEF within the cavity 58 will vaporize and be entrained into the central flow passage 40 and carried out through the flexible coupling 22. For example, the conditions which permit formation and collection of the liquified DEF can include initial engine start or following initiation of DEF injection, operation at engine idle speed for extended periods of time, and startup operation after extended engine off periods, particularly when startup also coincides with below freezing ambient temperature conditions.

Figure 2:
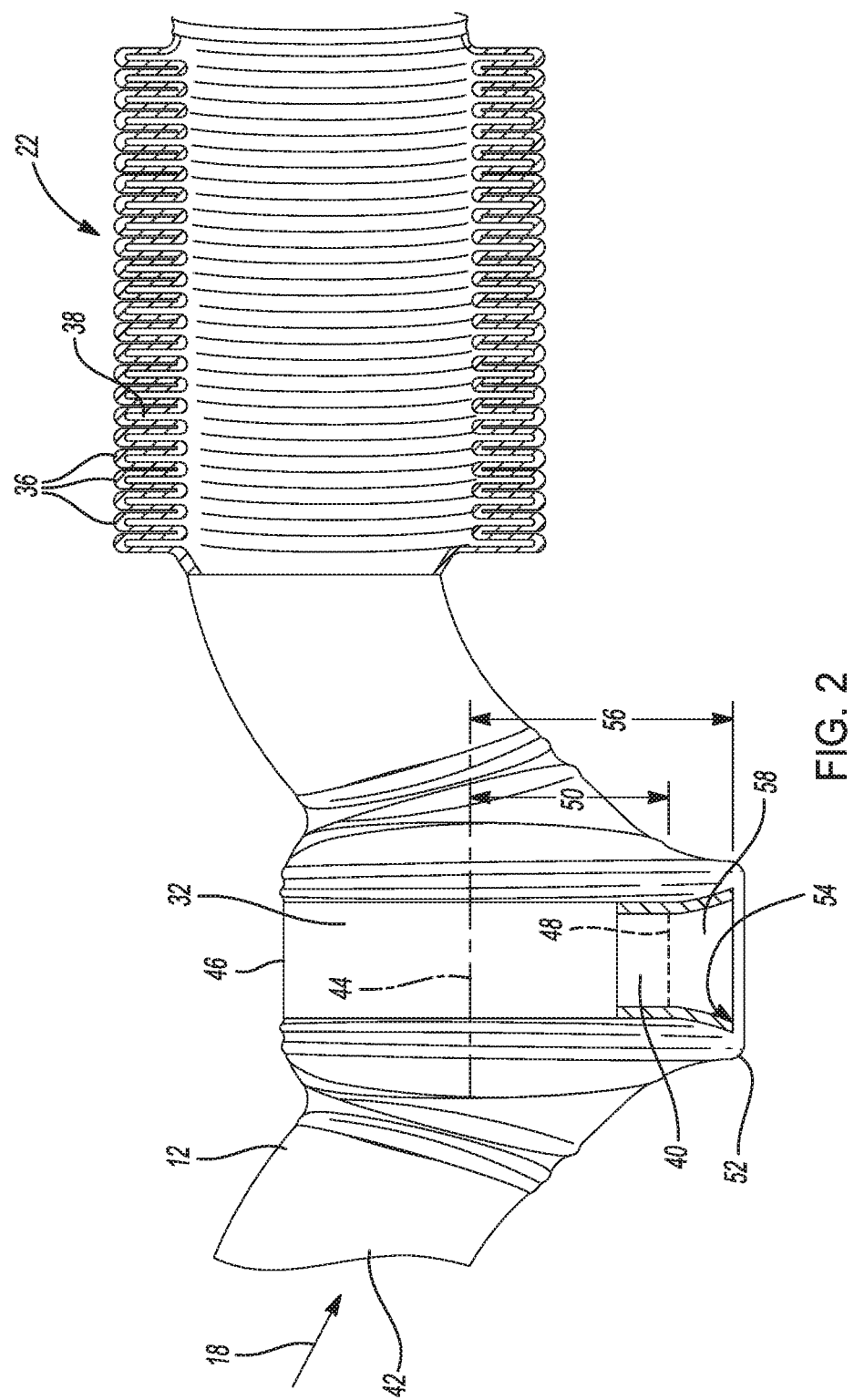
FIG. 2 is a front elevational partial cross-sectional view of a flexible coupling attached to the system and apparatus of FIG. 1.

Referring to FIG. 3 and again to FIG. 2, according to further aspects a DEF collection device 60 is modified from the DEF collection device 32. The DEF collection device 60 includes a lower portion 62 similar to the lower portion 52 having an inner wall 64 spaced from a central axis 66. A cavity 68 is provided within the lower portion 62 for collection of liquified DEF. The cavity 68 is modified from the cavity 58 by further inclusion of an upper ceiling 70 provided by an extension portion 72 of DEF collection device body material which extends toward an upstream end of the DEF collection device 60. A dead-end wall 74 of the cavity 68 and the upper ceiling 70 further enhance the DEF liquid trapping capability of the DEF collection device 60 compared to the DEF collection device 32 by mitigating against vehicle motion and vibration from allowing liquid DEF to upwardly escape the cavity 68. An open upper limit 76 of the cavity 68 is substantially level with a lower entrance wall 78. Liquid DEF traveling along the lower entrance wall 78 moves as a film layer 80 into the cavity 68. According to several aspects, the DEF collection device 60 is releasably connected to the diesel exhaust pipeline 12 using a flange connection 82 and is releasably connected to the flexible coupling 22 using a flange connection 84.

Figure 3:
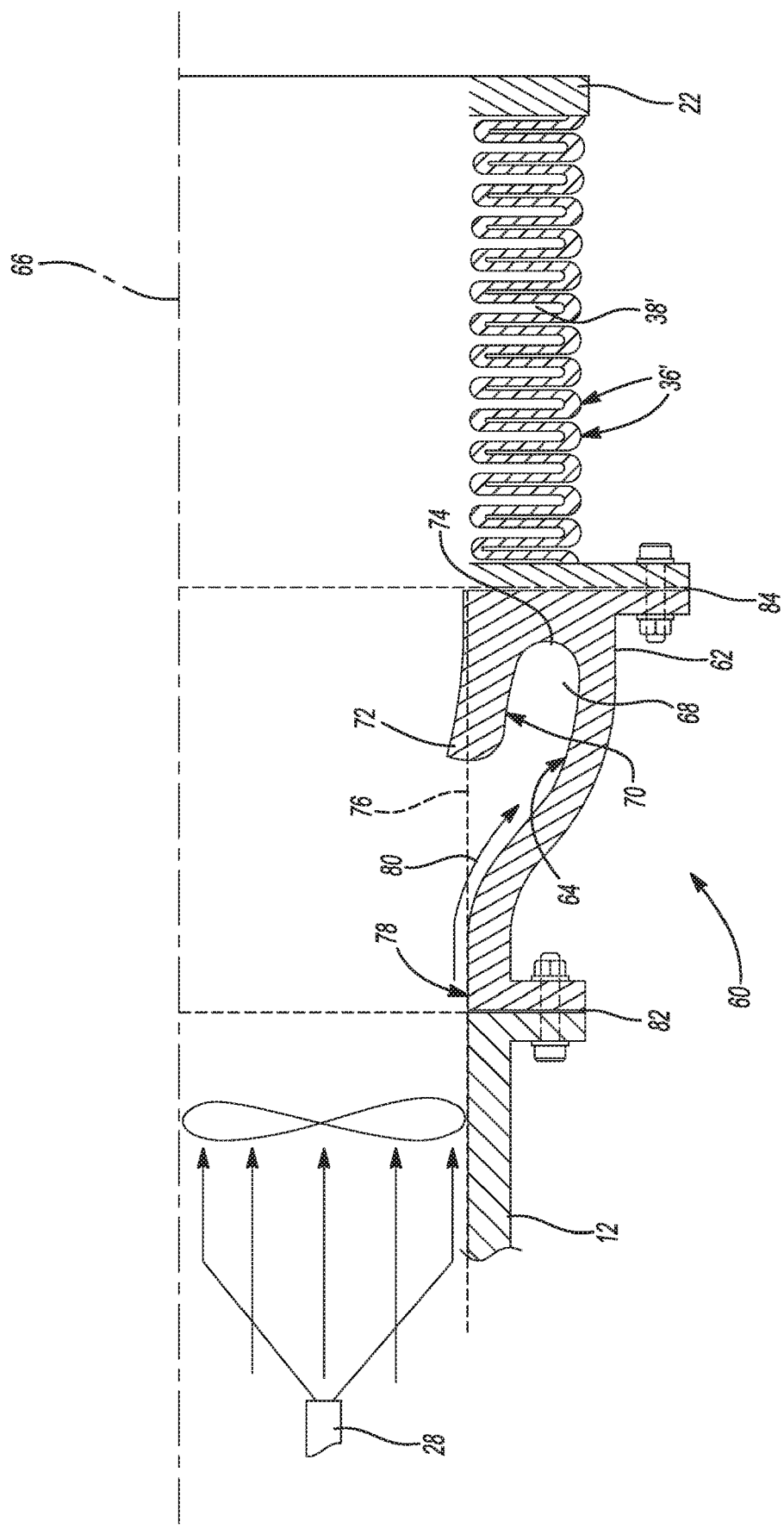
FIG. 3 is a front elevational partial cross-sectional view of another aspect of a system and apparatus modified from FIG. 1.
Figure 4:
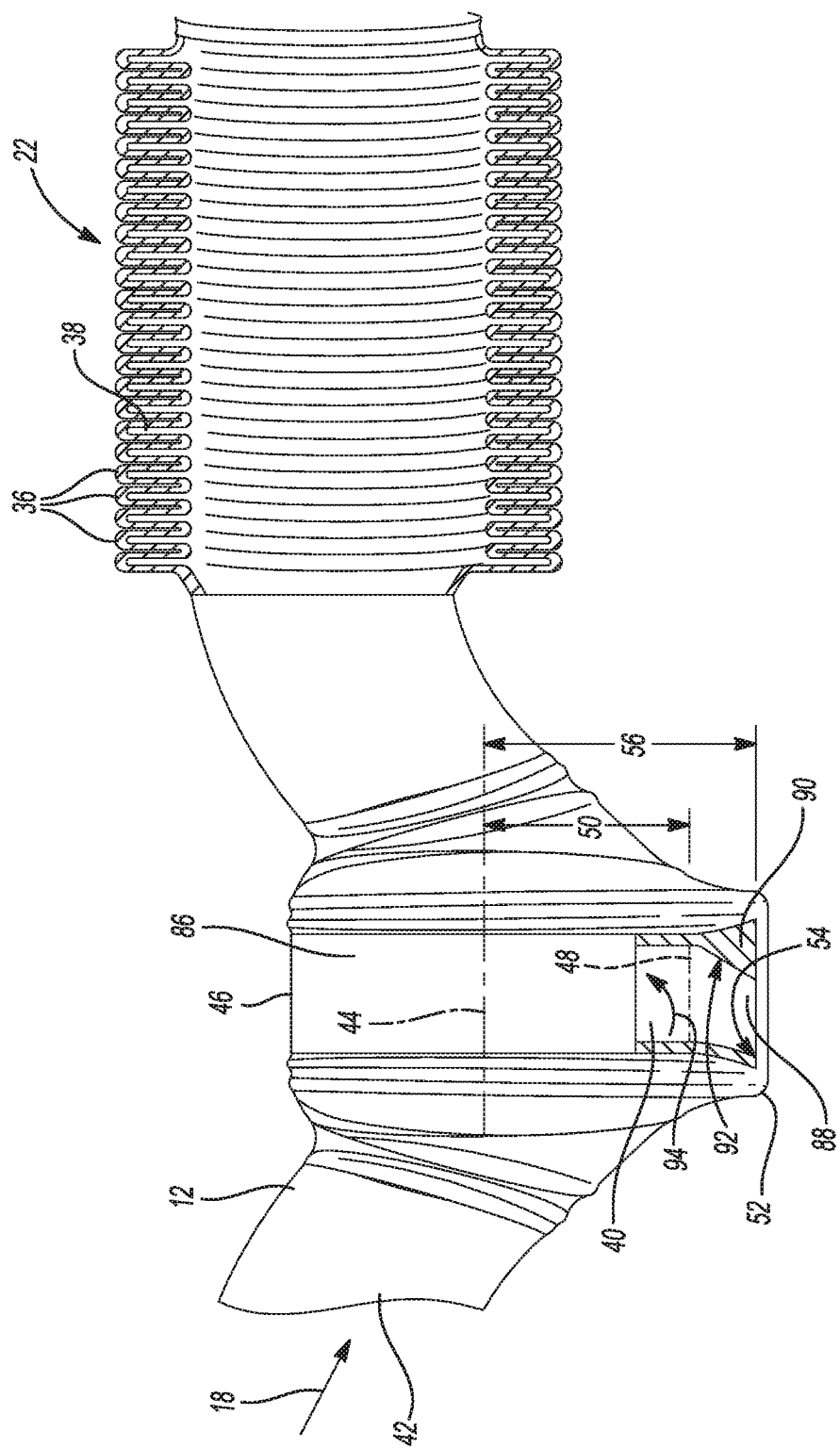
FIG. 4 is a front elevational partial cross-sectional view of another aspect of a system and apparatus modified from FIG. 1.

Referring to FIG. 4 and again to FIGS. 2 and 3, according to further aspects a DEF collection device 86 is modified from the DEF collection device 32, with common features identified using the same part numbers as the DEF collection device 32. The DEF collection device 86 includes a cavity 88 which is smaller than the cavity 58 by incorporation of a wall 90 having an upsloping wall face 92 in the direction of flow through the DEF collection device 86. The upsloping wall face 92 aids in creating a removal flow 94 which sweeps the cavity 88 of DEF by increasing a velocity of exhaust gas along the upsloping wall face 92 when the overall flow rate of exhaust gas through the central flow passage 40 increases.

Referring to FIG. 5 and again to FIGS. 1 and 2, according to further aspects a DEF collection device 96 is modified from the DEF collection device 32 to provide a cylindrical-shaped body 98 which permits liquid DEF collection at any axially rotated position of the DEF collection device 96. The diesel exhaust pipeline 12 is connected to the body 98 at a stepped connection 100. According to several aspects an inner diameter 102 of the body 98 is greater than an inner diameter 104 of the diesel exhaust pipeline 12. A body longitudinal axis 106 centrally extends through the body 98 such that an upper positioned wall portion 108 as viewed in FIG. 5 is spaced at a first dimension 110 from the body longitudinal axis 106 and a lower positioned wall portion 112 oppositely facing with respect to the upper positioned wall portion 108 is spaced at a second dimension 114 equal to the first dimension 110. A substantially cylindrical-shaped cavity 116 is therefore provided within the body 98.

The portion of un-vaporized liquid DEF flowing along a lowest positioned entrance wall 118 of the diesel exhaust pipeline 12 moves as a film layer into the cavity 116 and collects along a lowest elevated surface 120 of the body 98 similar to DEF collecting at the inner wall 54 of the DEF collection device 32. According to several aspects, the DEF collection device 96 is releasably connected to the diesel exhaust pipeline 12 using a flange connection and is releasably connected to the flexible coupling 22 using a flange connection, however the flange connections can be provided as other releasable or permanent connections such as clamped, brazed or welded to suit the particular installation. Because the body 98 is cylindrically shaped about the centrally disposed body longitudinal axis 106, the lowest elevated surface 120 where the un-vaporized or liquid DEF will collect is provided for any axially rotated position of the body 98 with respect to the body longitudinal axis 106. The DEF collection device 96 installer therefore does not need to preposition the body 98 at any specific axial rotated position during installation of the DEF collection device 96 to create a predetermined low-point.

A system to mitigate diesel exhaust fluid deposits in exhaust system flexible couplings of the present disclosure offers several advantages. These include provision of a DEF collection device which provides a low point or low elevation location to collect un-vaporized or liquid DEF prior to reaching the flexible connection. Reducing or eliminating un-vaporized or liquid DEF from reaching the flexible connection mitigates against crystallization of the DEF in the flexible connection, which is known to reduce flexibility of the flexible connection and failure of the flexible connection.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A system to mitigate diesel exhaust fluid deposits in vehicle exhaust system flexible couplings, comprising:
   a diesel exhaust pipeline;
   a diesel exhaust fluid injector connected to the diesel exhaust pipeline injecting a diesel exhaust fluid into the diesel exhaust pipeline;
   a flexible coupling connected to the diesel exhaust pipeline; and
   a diesel exhaust fluid collection device positioned in the diesel exhaust pipeline, the diesel exhaust fluid collection device having a liquid diesel exhaust fluid collection volume where an un-vaporized portion of the diesel exhaust fluid is collected,
   wherein the diesel exhaust fluid collection device includes a central flow passage sized to equal an internal flow passage of the diesel exhaust pipeline, the central flow passage equally divided along a central axis having an upper wall of the diesel exhaust fluid collection device equally spaced from a bottom wall by a radial dimension, and wherein the diesel exhaust fluid collection device includes a lower portion having an inner wall spaced from the central axis at a wall spacing dimension which is greater than the radial dimension.

2. The system to mitigate diesel exhaust fluid deposits in vehicle exhaust system flexible couplings of claim 1, further including a releasable connection connecting the diesel exhaust fluid collection device to the diesel exhaust pipeline to allow for removal of the diesel exhaust fluid collection device.

3. The system to mitigate diesel exhaust fluid deposits in vehicle exhaust system flexible couplings of claim 2, wherein the releasable connection defines a flanged joint.

4. The system to mitigate diesel exhaust fluid deposits in vehicle exhaust system flexible couplings of claim 2, wherein the releasable connection defines a clamp joint.

5. The system to mitigate diesel exhaust fluid deposits in vehicle exhaust system flexible couplings of claim 1, wherein the diesel exhaust fluid collection device is positioned between a connection location into the diesel exhaust pipeline of the diesel exhaust fluid injector and the flexible coupling.

6. The system to mitigate diesel exhaust fluid deposits in vehicle exhaust system flexible couplings of claim 1, wherein the liquid diesel exhaust fluid collection volume defines a low point cavity.

7. The system to mitigate diesel exhaust fluid deposits in vehicle exhaust system flexible couplings of claim 1, wherein the liquid diesel exhaust fluid collection volume defines a cavity between the inner wall and the bottom wall where the un-vaporized portion of the diesel exhaust fluid is collected.

8. The system to mitigate diesel exhaust fluid deposits in vehicle exhaust system flexible couplings of claim 1, wherein the diesel exhaust fluid collection device includes:
a lower portion having an inner wall spaced from a central axis;
a cavity provided within the lower portion for collection of the un-vaporized portion of the diesel exhaust fluid, the cavity having an upper ceiling provided by an extension portion of the diesel exhaust fluid collection device extending toward an upstream end of the diesel exhaust fluid collection device; and
a dead-end wall bounded within the cavity and the upper ceiling.

9. The system to mitigate diesel exhaust fluid deposits in vehicle exhaust system flexible couplings of claim 1, wherein the diesel exhaust fluid collection device includes a cylindrical-shaped body stepped downward from an inner wall of the diesel exhaust pipeline defining a lowest elevated surface, with an inner diameter of the body being greater than an inner diameter of the diesel exhaust pipeline and providing a cylindrical-shaped cavity within the body, wherein the un-vaporized portion of the diesel exhaust fluid collects within the cylindrical-shaped cavity on the lowest elevated surface of the body.

10. A system to mitigate diesel exhaust fluid deposits in vehicle exhaust system flexible couplings, comprising:
a diesel exhaust pipeline;
a diesel exhaust fluid injector connected to the diesel exhaust pipeline injecting a diesel exhaust fluid into the diesel exhaust pipeline;
a flexible coupling connected to the diesel exhaust pipeline; and
a diesel exhaust fluid collection device positioned in the diesel exhaust pipeline between a connection location into the diesel exhaust pipeline of the diesel exhaust fluid injector and the flexible coupling, the diesel exhaust fluid collection device having a liquid diesel exhaust fluid collection volume where an un-vaporized portion of the diesel exhaust fluid is collected, and
wherein an inner diameter of a body of the diesel exhaust fluid collection device is greater than an inner diameter of the diesel exhaust pipeline.

11. The system to mitigate diesel exhaust fluid deposits in vehicle exhaust system flexible couplings of claim 10, wherein the diesel exhaust fluid collection device includes:
a lower portion having an inner wall spaced from a central axis; and
the liquid diesel exhaust fluid collection volume defining a cavity provided within the lower portion for collection of the un-vaporized portion of the diesel exhaust fluid on the inner wall.

12. The system to mitigate diesel exhaust fluid deposits in vehicle exhaust system flexible couplings of claim 11, wherein the inner wall includes an upwardly sloping surface.

13. The system to mitigate diesel exhaust fluid deposits in vehicle exhaust system flexible couplings of claim 11, wherein the inner wall is planar and parallel with the central axis.

14. The system to mitigate diesel exhaust fluid deposits in vehicle exhaust system flexible couplings of claim 10, wherein a cylindrical-shaped cavity is provided within the body.

15. A system to mitigate diesel exhaust fluid deposits in vehicle exhaust system flexible couplings, comprising:
a diesel exhaust pipeline;
a diesel exhaust fluid injector connected to the diesel exhaust pipeline injecting a diesel exhaust fluid into the diesel exhaust pipeline;
a flexible coupling connected to the diesel exhaust pipeline downstream of a connection location of the diesel exhaust fluid injector; and
a diesel exhaust fluid collection device positioned in the diesel exhaust pipeline between the connection location into the diesel exhaust pipeline of the diesel exhaust fluid injector and the flexible coupling, the diesel exhaust fluid collection device having a liquid diesel exhaust fluid collection volume where an un-vaporized portion of the diesel exhaust fluid is collected, mitigating carryover of the un-vaporized portion of the diesel exhaust fluid into the flexible coupling,
wherein an inner diameter of a body of the diesel exhaust fluid collection device is greater than an inner diameter of the diesel exhaust pipeline and a cylindrical-shaped cavity is provided within the body centrally disposed with respect to an axis of the body allowing collection of the un-vaporized portion of the diesel exhaust fluid to be provided at any horizontal axial orientation of the body.

16. The system to mitigate diesel exhaust fluid deposits in vehicle exhaust system flexible couplings of claim 15, wherein the diesel exhaust fluid collection device includes:
a body having a central axis with an upper wall and a bottom wall equally spaced to the central axis; and
a lower portion having an inner wall spaced below the bottom wall defining a cavity between the inner wall and the bottom wall, the cavity collecting the un-vaporized portion of the diesel exhaust fluid.

* * * * *